(12) United States Patent
Dillavou et al.

(10) Patent No.: US 11,470,752 B2
(45) Date of Patent: Oct. 18, 2022

(54) CUSTOMIZABLE SHOVEL

(71) Applicants: Dwight Dillavou, Annabella, UT (US); Connie Dillavou, Annabella, UT (US)

(72) Inventors: Dwight Dillavou, Annabella, UT (US); Connie Dillavou, Annabella, UT (US)

( * ) Notice: Subject to any disclaimer, the term of this patent is extended or adjusted under 35 U.S.C. 154(b) by 0 days.

(21) Appl. No.: 17/074,788

(22) Filed: Oct. 20, 2020

(65) Prior Publication Data

US 2022/0117142 A1  Apr. 21, 2022

(51) Int. Cl.
*A01B 1/02* (2006.01)
*B25G 1/04* (2006.01)

(52) U.S. Cl.
CPC .............. *A01B 1/022* (2013.01); *B25G 1/04* (2013.01)

(58) Field of Classification Search
CPC .. A01B 1/02; A01B 1/022; B25G 1/04; E01H 5/02
USPC ...................................... 294/49, 51, 54.5, 57
See application file for complete search history.

(56) References Cited

U.S. PATENT DOCUMENTS

| | | | | | |
|---|---|---|---|---|---|
| 1,107,583 | A | * | 8/1914 | Burchell | A01B 1/022 294/51 |
| 1,319,306 | A | * | 10/1919 | Rogers | A01B 1/022 294/51 |
| 1,442,671 | A | * | 1/1923 | Krehbiel | A01B 1/22 294/51 |
| 2,254,586 | A | * | 9/1941 | Warwick | A01B 1/022 7/158 |
| 3,334,939 | A | * | 8/1967 | Bonic | E01H 5/02 294/51 |
| 5,345,635 | A | * | 9/1994 | Morgan | A01B 1/20 294/51 |
| 5,695,229 | A | * | 12/1997 | Chang | A01B 1/227 294/59 |
| 6,378,153 | B1 | * | 4/2002 | Morgan | A01B 1/022 294/51 |
| 2005/0242599 | A1 | * | 11/2005 | Demar | A01B 1/024 294/60 |
| 2010/0156124 | A1 | * | 6/2010 | Macri | E01H 5/02 294/51 |
| 2011/0304166 | A1 | * | 12/2011 | Rathmell | A63B 29/08 294/51 |
| 2017/0362789 | A1 | * | 12/2017 | Lovell | B25G 1/102 |

* cited by examiner

*Primary Examiner* — Paul T Chin
(74) *Attorney, Agent, or Firm* — The Iwashko Law Firm, PLLC; Lev Ivan Gabriel Iwashko

(57) ABSTRACT

A customizable shovel, including a telescopic assembly, including a first shaft section, a second shaft section movably disposed within a first end of the first shaft section, a plurality of adjustment buttons disposed on at least a portion of the first shaft section to extend the second shaft section from retracted to away from the first shaft section in response to depressing one of the plurality of adjustment buttons, a socket disposed on a second end of the second shaft section, and a blade connected to the socket to receive at least one item therein, an attachment assembly to removably connect to the blade, and a connecting assembly disposed on at least a portion of the attachment assembly to lock the attachment assembly to the telescopic assembly in a first position and unlock the attachment assembly from the telescopic assembly in a second position.

7 Claims, 3 Drawing Sheets

CUSTOMIZABLE SHOVEL

BACKGROUND

1. Field

The present general inventive concept relates generally to a shovel, and particularly, to a customizable shovel.

2. Description of the Related Art

Often times, while taking an outdoor trip into nature, such as parks and/or mountains, a person will bring several items to have a successful, adventurous, and safe outing. Some important items include food, clothing, water, gas, cans, and a shovel, etc. However, sometimes a small shovel may be preferable to move snow, rocks, and/or debris out of the way, but such a tool can be difficult to transport with all the additional items they must carry.

Additionally, most shovels have a fixed size, such as a fixed length and/or a fixed blade size. As such, people need to purchase multiple shovels to accommodate different needs.

Therefore, there is a need for a customizable shovel that can be adjusted based on a preference of a user.

SUMMARY

The present general inventive concept provides a customizable shovel.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a customizable shovel, including a telescopic assembly, including a first shaft section, a second shaft section movably disposed at a first end within a first end of the first shaft section, a plurality of adjustment buttons disposed on at least a portion of the first shaft section to extend the second shaft section from retracted to away from the first shaft section to at least one predetermined position in response to depressing one of the plurality of adjustment buttons, and retract the second shaft section from extended toward the first shaft section in response to collectively depressing the plurality of adjustment buttons, a socket disposed on a second end of the second shaft section, and a blade connected to the socket to receive at least one item therein, an attachment assembly to removably connect to the blade, and a connecting assembly disposed on at least a portion of the attachment assembly to lock the attachment assembly to the telescopic assembly in a first position and unlock the attachment assembly from the telescopic assembly in a second position.

The first shaft section may include at least one hole to receive at least one of the plurality of adjustment buttons therethrough.

The plurality of adjustment buttons may retract the second shaft section from extended toward the first shaft section in response to collectively depressing the plurality of adjustment buttons.

The attachment assembly may include a body to receive the at least one item therein, and a blade receiving aperture disposed on at least a portion of a top edge of the body to receive the blade therein.

The connecting assembly may at least partially deform in response to inserting the blade into the attachment assembly.

The customizable shovel may further include a handle assembly removably disposed on at least a portion of a second end of the first shaft section to facilitate gripping thereof.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
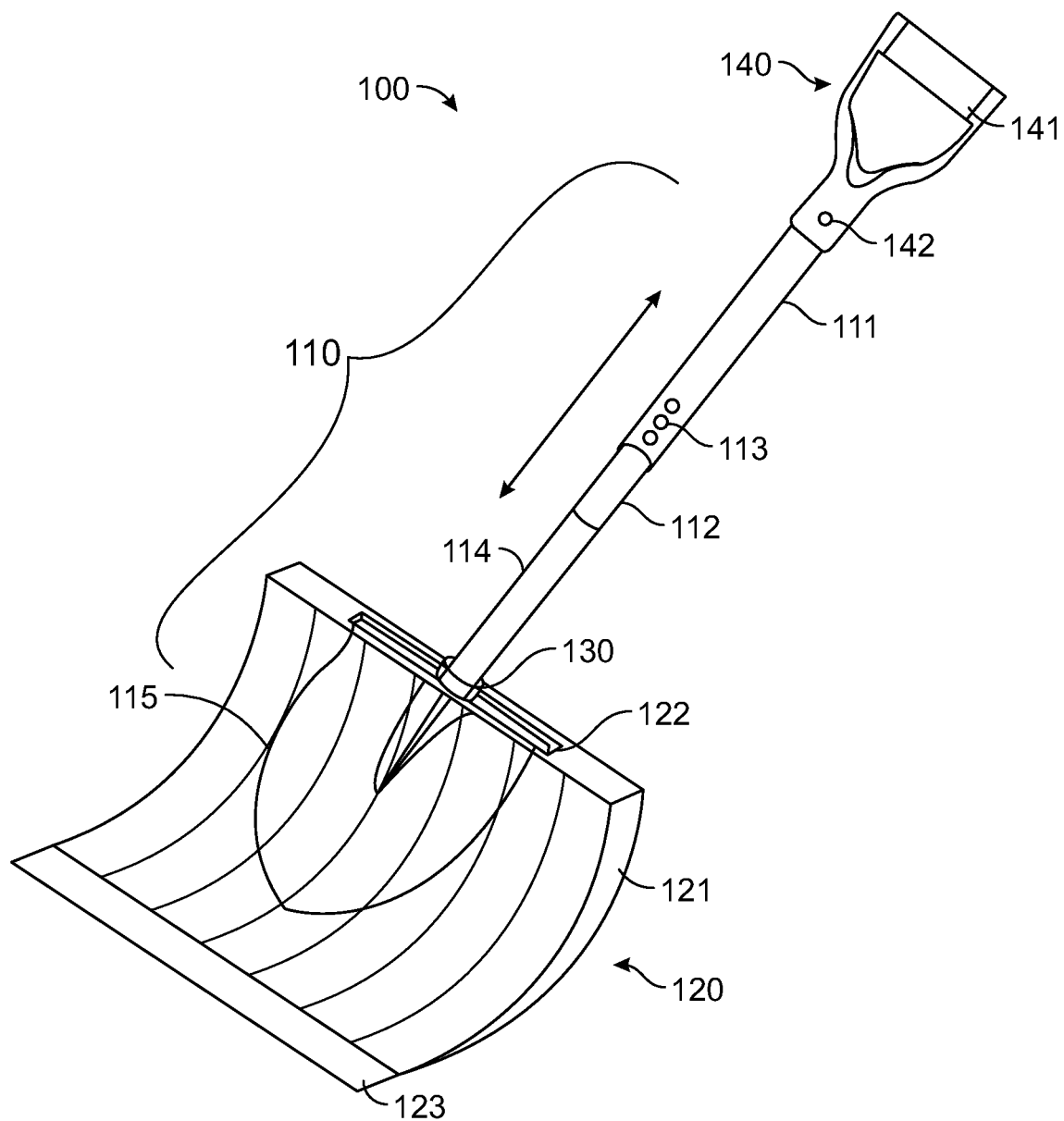
FIG. 1 illustrates a front perspective view of a customizable shovel, according to an exemplary embodiment of the present general inventive concept.

Various example embodiments (a.k.a. exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Customizable Shovel 100
Telescopic Assembly 110
First Shaft Section 111
Second Shaft Section 112
Adjustment Buttons 113
Socket 114
Blade 115
Attachment Assembly 120
Body 121
Blade Receiving Aperture 122
Cutting Edge 123
Locking Assembly 130
Lock Body 131
Movable Portion 132
Hook Portion 133
Hook Receiving Portion 134
Hinges 135
Handle Assembly 140
Handle Body 141
Detachment Button 142
Wall Mount 150
Mount Body 151
Brackets 152

FIG. 1 illustrates a front perspective view of a customizable shovel 100, according to an exemplary embodiment of the present general inventive concept.

The customizable shovel 100 may be constructed from at least one of metal, plastic, wood, and rubber, etc., but is not limited thereto.

The customizable shovel 100 may include a telescopic assembly 110, an attachment assembly 120, a locking assembly 130, a handle assembly 140, and a wall mount 150, but is not limited thereto.

Referring to FIG. 1, the telescopic assembly 110 is illustrated to be a shovel. However, the telescopic assembly 110 may be a spade, an edger, and a hoe, or any other type of gardening tool known to one of ordinary skill in the art, but is not limited thereto.

The telescopic assembly 110 may include a first shaft section 111, a second shaft section 112, a plurality of adjustment buttons 113, a socket 114, and a blade 115, but is not limited thereto.

The first shaft section 111 may have a predetermined size (i.e. length, width, and height) based on a preference of a user and/or a manufacturer. For example, the first shaft section 111 may have a length of eighteen inches, and the second shaft section 112 may have a length of eighteen inches, such that the first shaft section 111 and the second shaft section 112 have a combined length of thirty-six inches. In other words, the length of the first shaft section 111 and/or the length of the second shaft section 112 may be equivalent. Alternatively, the first shaft section 111 and/or the second shaft section 112 may differ in lengths.

A first end of the second shaft section 112 may be movably (i.e. slidably) disposed within a first end of the first shaft section 111. In other words, the first end of the first shaft section 111 may receive the second shaft section 112 therein. As such, the second shaft section 112 may move away from the first shaft section 111 in a first direction or a second direction, and toward the first shaft section 111 in the second direction or the first direction.

The plurality of adjustment buttons 113 may be disposed on at least a portion of the first shaft section 111. Moreover, the plurality of adjustment buttons 113 may facilitate (i.e. allow) movement of the second shaft section 112 in response to depressing at least one of the plurality of adjustment buttons 113, such that each of the plurality of adjustment buttons 113 corresponds to a different position of the second shaft section 112 with respect to the first shaft section 111. As such, the length of the second shaft section 112 may be extended and/or retracted within the first shaft section 111 based on depressing at least one of the plurality of adjustment buttons 113, such that the second shaft section 112 may move to a first predetermined position, a second predetermined position, and/or a third predetermined position. In other words, the second shaft section 112 may extend from retracted in a first position to at least partially extended in a second position in response to depressing at least one of the plurality of adjustment buttons 113. Conversely, the plurality of adjustment buttons 113 may be collectively depressed to retract the second shaft section 112 into the first shaft section 111.

Alternatively, the plurality of adjustment buttons 113 may be a single adjustment button 113 disposed on the second shaft section 112. More specifically, a plurality of holes (e.g. at least three holes) on the first shaft section 111 may receive the adjustment button 113 therethrough, such that the length of the second shaft section 112 may be adjusted in response to depressing the adjustment button 113, such that the adjustment button 113 may be moved to at least one of the plurality of holes.

Accordingly, the plurality of adjustment buttons 113 may be used to adjust the length of the second shaft section 112.

The socket 114 may be disposed on at least a portion of a second end of the second shaft section 112. Additionally, the socket 114 may be integrally connected to the blade 115. Furthermore, the blade 115 may be used to receive at least one item (e.g., dirt, debris, rocks, snow, etc.) therein via scooping and/or picking up.

The blade 115 may have a predetermined size, such as eight inches long and six and one-quarter of an inch in width.

The attachment assembly 120 may include a body 121, a blade receiving aperture 122, and a cutting edge 123, but is not limited thereto.

Referring to FIG. 1, the body 121 may have a size (i.e. length, width, and height) larger than the blade 115. For example, the body 121 may have a length of sixteen inches and a width of 17 inches. Also, the body 121 is illustrated to be a snow shovel. However, the body 121 may be a spade, an edger, and a hoe, or any other type of gardening tool known to one of ordinary skill in the art, but is not limited thereto.

The blade receiving aperture 122 may be disposed on at least a portion of a top edge of the body 121. Moreover, the blade receiving aperture 122 may receive the blade 115 therein. Also, the blade receiving aperture 122 may have a size to snugly fit (i.e. only fit) the blade 115 therein. In other words, a length and/or a width of the blade receiving aperture 122 may be equivalent, such that a length and/or a width of the blade 115 fits into the blade receiving aperture 122.

Therefore, the body 121 may be removably connected to the blade 115. As such, the body 121 may be used to receive the at least one item (e.g., dirt, debris, rocks, snow, etc.) therein via scooping and/or picking up.

The cutting edge 123 may be disposed on at least a portion of a bottom edge of the body 121. Additionally, the cutting edge 123 may be sharp and/or cut the at least one item. As such, the cutting edge 123 may break apart the at least one item in response to contacting the at least one item.

Figure 2:
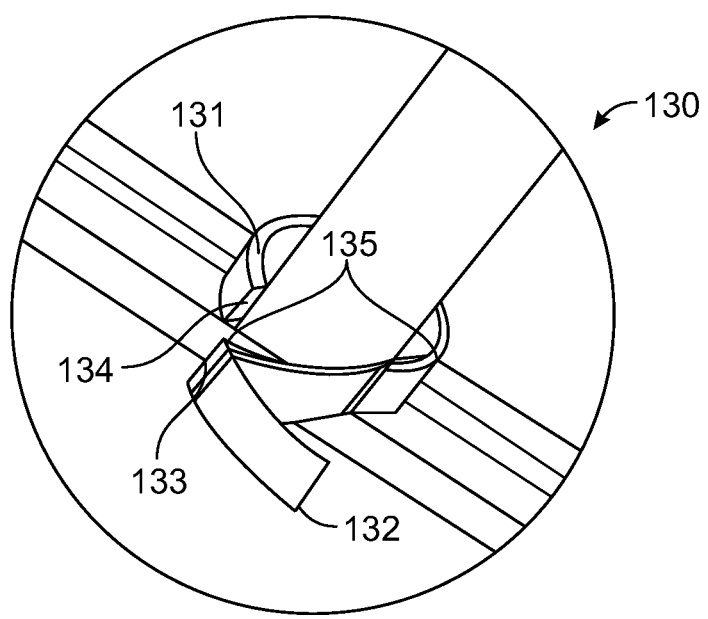
FIG. 2 illustrates a zoomed in view of a connecting assembly, according to an exemplary embodiment of the present general inventive concept.

FIG. 2 illustrates a zoomed in view of a connecting assembly 130, according to an exemplary embodiment of the present general inventive concept.

The connecting assembly 130 may include a lock body 131, a movable portion 132, a hook portion 133, a hook receiving portion 134, and a plurality of hinges 135, but is not limited thereto.

Referring to FIG. 2, the lock body 131 is illustrated to have a circular shape. However, the lock body 131 may be rectangular, triangular, conical, pentagonal, hexagonal, heptagonal, octagonal, or any other shape known to one of ordinary skill in the art.

The lock body 131 may be disposed on at least a portion of the top edge of the body 121. The lock body 131 may at least partially deform in response to a force applied thereto, such as insertion of the blade 115 into the blade receiving aperture 122.

The movable portion 132 may be hingedly disposed on at least a portion of the body 131 via each of the plurality of hinges 135. Additionally, the movable portion 132 may have a first portion and a second portion separated by at least one of the plurality of hinges 135, such that the movable portion 132 may move (i.e. pivot) about at least one of the plurality of hinges 135 between the first portion and the second portion.

Moreover, the hook portion 133 may be disposed between the first portion and/or the second portion of the movable portion 132. The hook portion 133 may be removably connected to the hook receiving portion 134. The hook portion 133 may be prevented from detaching from the hook receiving portion 134 in response to moving (i.e. closing) the second portion toward the first portion in a first position. Furthermore, the hook portion 133 may detach from the hook receiving portion 134 in response to moving (i.e. opening) the second portion away from the first portion in a second position.

Therefore, the hook portion 133 may lock and/or unlock the telescopic assembly 110 to the attachment assembly 120.

The handle assembly 140 may include a handle body 141 and a detachment button 142, but is not limited thereto.

The handle body 141 may be removably disposed on at least a portion of a second end of the first shaft section 111. The handle body 141 may have a predetermined size, such as four inches wide. The handle body 141 may facilitate gripping thereof.

The detachment button 142 may be disposed on at least a portion of the handle body 141. Also, the handle body 141 may be removed from the first shaft section 111 in response to depressing the detachment button 142. As such, the handle body 141 may be replaced with another handle body 141 based on the preference of the user and/or the manufacturer.

Figure 3:
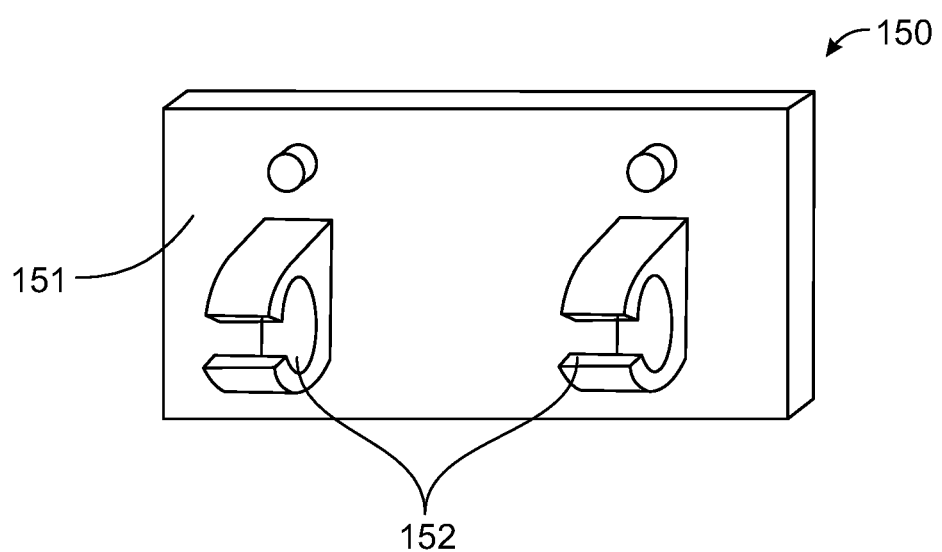
FIG. 3 illustrates a front perspective view of a wall mount, according to an exemplary embodiment of the present general inventive concept.

FIG. 3 illustrates a front perspective view of a wall mount 150, according to an exemplary embodiment of the present general inventive concept.

The wall mount 150 may include a mount body 151 and a plurality of brackets 152, but is not limited thereto.

The mount body 151 is illustrated to be of a predetermined size (i.e. length, width, height) based on a preference of the user and/or the manufacturer. However, the size of the mount body 151 may correspond to the size of the telescopic assembly 110. For example, the mount body 151 may have a length of twelve inches and a width of four inches. Also, the mount body 151 may be removably connected to a wall.

The plurality of brackets 152 may be disposed on at least a portion of the mount body 151. The plurality of brackets 152 may at least partially deform in response to inserting the first shaft section 111 and/or the second shaft section 112. In other words, the plurality of brackets 152 may receive the first shaft section 111 and/or the second shaft section 112 therein. Subsequent to inserting the first shaft section 111 and/or the second shaft section 112 into the plurality of brackets 152, the plurality of brackets 152 may return to their original shape.

As such, the telescopic assembly 110, the attachment assembly 120, the connecting assembly 130, and/or the handle assembly 140 may be suspended from the wall while disposed on the wall mount 150. As such, the wall mount 150 may store the telescopic assembly 110, the attachment assembly 120, the connecting assembly 130, and/or the handle assembly 140 thereon.

Therefore, the customizable shovel 100 be adjusted on the handle assembly 140 and/or the attachment assembly 120.

The present general inventive concept may include a customizable shovel 100, including a telescopic assembly 110, including a first shaft section 111, a second shaft section 112 movably disposed at a first end within a first end of the first shaft section 111, a plurality of adjustment buttons 113 disposed on at least a portion of the first shaft section 111 to extend the second shaft section 112 from retracted to away from the first shaft section 111 to at least one predetermined position in response to depressing one of the plurality of adjustment buttons 113, a socket 114 disposed on a second end of the second shaft section 112, and a blade 115 connected to the socket 114 to receive at least one item therein, an attachment assembly 120 to removably connect to the blade 115, and a connecting assembly 130 disposed on at least a portion of the attachment assembly 120 to lock the attachment assembly 120 to the telescopic assembly 110 in a first position and unlock the attachment assembly 120 from the telescopic assembly 110 in a second position.

The first shaft section 111 may include at least one hole to receive at least one of the plurality of adjustment buttons 113 therethrough.

The plurality of adjustment buttons 113 may retract the second shaft section 112 from extended toward the first shaft section 111 in response to collectively depressing the plurality of adjustment buttons 113.

The attachment assembly 120 may include a body 121 to receive the at least one item therein, and a blade receiving aperture 122 disposed on at least a portion of a top edge of the body 121 to receive the blade 115 therein.

The connecting assembly 130 may at least partially deform in response to inserting the blade 115 into the attachment assembly 120.

The customizable shovel 100 may further include a handle assembly 140 removably disposed on at least a portion of a second end of the first shaft section 111 to facilitate gripping thereof.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A customizable shovel, comprising:
   a telescopic assembly, comprising:
      a first shaft section,
      a second shaft section movably disposed at a first end within a first end of the first shaft section,
      a plurality of adjustment buttons disposed on at least a portion of the first shaft section to extend the second shaft section from retracted to away from the first shaft section to at least one predetermined position in response to depressing one of the plurality of adjustment buttons,
      a socket disposed on a second end of the second shaft section, and
      a blade connected to the socket to receive at least one item therein;
   an attachment assembly to removably connect to the blade and receive the blade therein, such that the blade is only visible from entry into the attachment assembly; and
   a connecting assembly disposed on at least a portion of the attachment assembly to lock the attachment assembly to the telescopic assembly in a first position and unlock the attachment assembly from the telescopic assembly in a second position.

2. The customizable shovel of claim 1, wherein the first shaft section comprises at least one hole to receive at least one of the plurality of adjustment buttons therethrough.

3. The customizable shovel of claim 1, wherein the plurality of adjustment buttons retracts the second shaft section from extended toward the first shaft section in response to collectively depressing the plurality of adjustment buttons.

4. The customizable shovel of claim 1, wherein the attachment assembly comprises:
   a body to receive the at least one item therein; and
   a blade receiving aperture disposed on at least a portion of a top edge of the body to receive the blade therein.

5. The customizable shovel of claim 1, wherein the connecting assembly at least partially deforms in response to inserting the blade into the attachment assembly.

6. The customizable shovel of claim 1, further comprising:
   a handle assembly removably disposed on at least a portion of a second end of the first shaft section to facilitate gripping thereof.

7. A customizable shovel, comprising:
   a telescopic assembly, comprising:
      a first shaft section,
      a second shaft section movably disposed at a first end within a first end of the first shaft section,
      a plurality of adjustment buttons disposed on at least a portion of the first shaft section to extend the second shaft section from retracted to away from the first shaft section to at least one predetermined position in response to depressing one of the plurality of adjustment buttons,
      a socket disposed on a second end of the second shaft section, and
      a blade connected to the socket to receive at least one item therein;
   an attachment assembly to removably connect to the blade; and
   a connecting assembly, comprising:
      a lock body disposed on at least a portion of the attachment assembly,
      a movable portion having a first portion and a second portion, the movable portion hingedly disposed on at least a portion of the lock body,
      a hook portion disposed between the first portion and the second portion of the movable portion, and
      a hook receiving portion disposed on at least a portion of the lock body to removably connect to the hook portion in response to moving the second portion toward the first portion in a first position and detaching the hook portion from the hook receiving portion in response to moving the second portion away from the first portion in a second position.

* * * * *